US011935186B2

(12) United States Patent
Cheng

(10) Patent No.: US 11,935,186 B2
(45) Date of Patent: Mar. 19, 2024

(54) POINT CLOUD DATA BASED MODELING METHOD AND APPARATUS, DEVICE AND STORAGE MEDIUM

(71) Applicant: REALSEE (BEIJING) TECHNOLOGY CO., LTD., Beijing (CN)

(72) Inventor: Xianyu Cheng, Beijing (CN)

(73) Assignee: REALSEE (BEIJING) TECHNOLOGY CO., LTD., Beijing (CN)

( * ) Notice: Subject to any disclaimer, the term of this patent is extended or adjusted under 35 U.S.C. 154(b) by 157 days.

(21) Appl. No.: 17/780,726

(22) PCT Filed: Nov. 13, 2020

(86) PCT No.: PCT/CN2020/128648
§ 371 (c)(1),
(2) Date: May 27, 2022

(87) PCT Pub. No.: WO2021/104045
PCT Pub. Date: Jun. 3, 2021

(65) Prior Publication Data
US 2022/0292767 A1    Sep. 15, 2022

(30) Foreign Application Priority Data

Nov. 28, 2019    (CN) .......................... 201911194067.2

(51) Int. Cl.
*G06T 17/00*    (2006.01)
(52) U.S. Cl.
CPC .......... *G06T 17/00* (2013.01); *G06T 2200/08* (2013.01); *G06T 2207/10028* (2013.01)
(58) Field of Classification Search
None
See application file for complete search history.

(56) References Cited

U.S. PATENT DOCUMENTS

| | | | |
|---|---|---|---|
| 11,786,206 B2 * | 10/2023 | Steines | A61B 90/37 |
| | | | 378/91 |
| 2014/0111812 A1 * | 4/2014 | Baeg | G01S 17/87 |
| | | | 356/610 |

(Continued)

FOREIGN PATENT DOCUMENTS

| | | |
|---|---|---|
| CN | 105738915 A | 7/2016 |
| CN | 107272018 A | 10/2017 |

(Continued)

OTHER PUBLICATIONS

Liu et al., Three-dimensional modeling of laser point cloud data in indoor scene, Surveying and Mapping Bulletin: Proceedings of the Symposium on Leading Technologies of Surveying and Mapping Science.

(Continued)

*Primary Examiner* — Robert J Craddock
(74) *Attorney, Agent, or Firm* — Enable IP, P.C.

(57) ABSTRACT

A modeling method and apparatus based on point cloud data, an electronic device, and a storage medium are provided, and relate to the field of three-dimensional panoramic technologies. The modeling method based on point cloud data includes: obtaining three-dimensional point cloud information collected by a point cloud collection device from a scanned target, a first time information, first rotation position information of an electric motor, and a second time information; determining second rotation position information based on the first time information and the second time information; and obtaining position information of the scanned target based on the three-dimensional point cloud information and the second rotation position information, to construct a three-dimensional panoramic model corresponding to the scanned target.

18 Claims, 4 Drawing Sheets

(56) References Cited

U.S. PATENT DOCUMENTS

2018/0284235 A1 10/2018 Ohtomo et al.
2019/0320154 A1 10/2019 Köhle et al.

FOREIGN PATENT DOCUMENTS

| | | |
|---|---|---|
| CN | 105157566 B | 2/2018 |
| CN | 108279420 A | 7/2018 |
| CN | 108535736 A | 9/2018 |
| CN | 109102537 A | 12/2018 |
| CN | 109215108 A | 1/2019 |
| CN | 109507679 A | 3/2019 |
| CN | 110412616 A | 11/2019 |
| CN | 110992468 B | 10/2020 |
| CN | 110007300 B | 8/2021 |
| EP | 3425332 B1 | 12/2021 |
| JP | 2010286436 A | 12/2010 |
| JP | 2017111019 A | 6/2017 |

OTHER PUBLICATIONS

Wang, Research on Data Acquisition and Processing of Point Cloud in medium-range 3D Laser Scanner; Ji Lin University Master's Thesis, 2017.

\* cited by examiner

POINT CLOUD DATA BASED MODELING METHOD AND APPARATUS, DEVICE AND STORAGE MEDIUM

CROSS-REFERENCE TO RELATED APPLICATIONS

The present application is a U.S. National Stage application of International Application No. PCT/CN2020/128648, filed on Nov. 13, 2020, which is based upon and claims priorities to Chinese Application No. 2019111940672 filed on Nov. 28, 2019, which are incorporated by reference in their entireties for all purposes.

TECHNICAL FIELD

The present disclosure relates to the field of three-dimensional panoramic technologies, and in particular, to a modeling method and apparatus based on point cloud data, an electronic device, and a storage medium.

BACKGROUND

In a process of three-dimensional modeling, a laser radar is used to scan and obtain three-dimensional point cloud data. Then, a three-dimensional model is constructed through splicing and fusion of the data obtained by the laser radar from different positions at different moments. Most currently used laser radars are (single-line or multi-line) mechanical rotary laser radars. The laser radars need to perform a scan in a motion state and need to precisely determine spatial positions of data returned by the laser radars, to splice the data onto correct positions in a three-dimensional panorama. At present, a position for splicing the data returned by the laser radars is usually determined by using an inertial measurement unit (IMU), historical scanning data, algorithmic estimation, and other information. However, this leads to high costs, while it is difficult to guarantee precision, which causes a lower quality of modeling.

SUMMARY

Embodiments of the present disclosure provide a modeling method and apparatus based on point cloud data, an electronic device, a storage medium, and a computer program product.

According to an aspect of the embodiments of the present disclosure, a modeling method based on point cloud data is provided, the method including: obtaining three-dimensional point cloud information collected by a point cloud collection device from a scanned target and a first time information when the three-dimensional point cloud information is collected; obtaining first rotation position information of an electric motor and a second time information corresponding to the first rotation position information, where the electric motor is configured to drive the point cloud collection device to rotate; determining second rotation position information corresponding to the three-dimensional point cloud information based on the first time information and the second time information; and obtaining position information of the scanned target based on the three-dimensional point cloud information and the second rotation position information, to construct a three-dimensional panoramic model corresponding to the scanned target based on the position information of the scanned target.

In some examples, the obtaining three-dimensional point cloud information collected by a point cloud collection device from a scanned target and a first time information when the three-dimensional point cloud information is collected includes: receiving a point cloud data packet collected by the point cloud collection device from the scanned target at a data collection point; and extracting the three-dimensional point cloud information, the first time information, and a scanning angle of the point cloud collection device from the point cloud data packet. The electric motor drives the point cloud collection device to rotate to the data collection point, and the scanning angle is an included angle between a scanning direction of the point cloud collection device and a plane of rotation of the point cloud collection device.

In some examples, the obtaining first rotation position information of an electric motor and a second time information corresponding to the first rotation position information includes: receiving a pulse signal sent by a controller or an encoder and the second time information corresponding to the pulse signal. The controller is configured to drive the electric motor to run, and the encoder is mounted on an output shaft of the electric motor to measure a rotation speed of the electric motor.

In some examples, the determining second rotation position information corresponding to the three-dimensional point cloud information based on the first time information and the second time information includes: generating a first timestamp based on the first time information, and generating a second timestamp based on the second time information; establishing a correspondence between the second timestamp and the pulse signal; and obtaining, based on the correspondence, a pulse signal corresponding to the second timestamp that is the same as or closest to the first timestamp, and using the pulse signal to determine a rotation angle of the electric motor.

In some examples, the position information of the scanned target includes: an X-axis coordinate value, a Y-axis coordinate value, and a Z-axis coordinate value of the scanned target. The obtaining position information of the scanned target based on the three-dimensional point cloud information and the second rotation position information includes: establishing an X-axis coordinate conversion relationship and a Y-axis coordinate conversion relationship based on the rotation angle and the scanning angle respectively; establishing a Z-axis coordinate conversion relationship based on the scanning angle; and converting the three-dimensional point cloud information based on the X-axis coordinate conversion relationship, the Y-axis coordinate conversion relationship, and the Z-axis coordinate conversion relationship to obtain the position information of the scanned target.

In some examples, the three-dimensional point cloud information includes: a distance between the point cloud collection device and the scanned target. The X-axis coordinate conversion relationship is: $x_n = d_n * \cos \beta_n * \cos \alpha_n$; the Y-axis coordinate conversion relationship is: $y_n = d_n * \sin \beta_n * \cos \alpha_n$; and the Z-axis coordinate conversion relationship is: $z_n = d_n * \sin \alpha_n$, where $d_n$ is the distance, $x_n$ is the X-axis coordinate value, $y_n$ is the Y-axis coordinate value, $z_n$ is the Z-axis coordinate value, $\beta_n$ is the rotation angle of the electric motor, the point cloud collection device rotates in a horizontal plane, $\alpha_n$ is the scanning angle, and the scanning angle is a pitch angle.

According to another aspect of the embodiments of the present disclosure, a modeling apparatus based on point cloud data is provided, the apparatus including: a point cloud data obtaining module configured to obtain three-dimensional point cloud information collected by a point cloud collection device from a scanned target and a first time information when the three-dimensional point cloud information is collected a position information obtaining module configured to obtain first rotation position information of an electric motor and a second time information corresponding to the first rotation position information, where the electric motor is configured to drive the point cloud collection device to rotate; a position information determination module configured to determine second rotation position information corresponding to the three-dimensional point cloud information based on the first time information and the second time information; and a target position obtaining module configured to obtain position information of the scanned target based on the three-dimensional point cloud information and the second rotation position information, to construct a three-dimensional panoramic model corresponding to the scanned target based on the position information of the scanned target.

In some examples, the point cloud data obtaining module is further configured to: receive a point cloud data packet collected by the point cloud collection device from the scanned target at a data collection point; and extract the three-dimensional point cloud information, the first time information, and a scanning angle of the point cloud collection device from the point cloud data packet. The electric motor drives the point cloud collection device to rotate to the data collection point, and the scanning angle is an included angle between a scanning direction of the point cloud collection device and a plane of rotation of the point cloud collection device.

In some examples, the position information obtaining module is further configured to receive a pulse signal sent by a controller or an encoder and the second time information corresponding to the pulse signal. The controller is configured to drive the electric motor to run, and the encoder is mounted on an output shaft of the electric motor to measure a rotation speed of the electric motor.

In some examples, the position information determination module is further configured to: generate a first timestamp based on the first time information, and generate a second timestamp based on the second time information; establish a correspondence between the second timestamp and the pulse signal; and obtain, based on the correspondence, a pulse signal corresponding to the second timestamp that is the same as or closest to the first timestamp, and use the pulse signal to determine a rotation angle of the electric motor.

In some examples, the position information includes: an X-axis coordinate value, a Y-axis coordinate value, and a Z-axis coordinate value of the scanned target. The target position obtaining module is further configured to: establish an X-axis coordinate conversion relationship and a Y-axis coordinate conversion relationship based on the rotation angle and the scanning angle respectively; establish a Z-axis coordinate conversion relationship based on the scanning angle; and convert the three-dimensional point cloud information based on the X-axis coordinate conversion relationship, the Y-axis coordinate conversion relationship, and the Z-axis coordinate conversion relationship to obtain the position information of the scanned target.

In some examples, the three-dimensional point cloud information further includes a distance between the point cloud collection device and the scanned target. The established X-axis coordinate conversion relationship is: $x_n = d_n * \cos \beta_n * \cos \alpha_n$; the Y-axis coordinate conversion relationship is: $y_n = *\sin \beta_n * \cos \alpha_n$; and the Z-axis coordinate conversion relationship is: $z_n = d_n * \sin \alpha_n$, where $d_n$ is the distance, $x_n$ is the X-axis coordinate value, $y_n$ is the Y-axis coordinate value, $z_n$ is the Z-axis coordinate value, $\beta_n$ is the rotation angle of the electric motor, the point cloud collection device rotates in a horizontal plane, $\alpha_n$ is the scanning angle, and the scanning angle is a pitch angle.

According to still another aspect of the embodiments of the present disclosure, a computer-readable storage medium is provided. The storage medium stores a computer program, and when the computer program is executed by a processor, the processor is caused to implement the steps of the method according to the embodiments of the present disclosure.

According to yet another aspect of the embodiments of the present disclosure, an electronic device is provided, the electronic device including: a processor; and a memory and a computer program stored on the memory. The processor is configured to execute the computer program to implement the steps of the method according to the embodiments of the present disclosure.

According to yet still another aspect of the embodiments of the present disclosure, a computer program product is provided. The computer program product includes a computer program, where when the computer program is executed by a processor, the steps of the method according to the embodiments of the present disclosure are implemented.

According to the modeling method and apparatus based on point cloud data, the electronic device, the storage medium, and the computer program product provided in the embodiments of the present disclosure, a position of point cloud data in a three-dimensional panoramic model can be more precisely determined.

The technical solution of the present disclosure is further described in detail through the accompanying drawings and the embodiments below.

BRIEF DESCRIPTION OF THE DRAWINGS

The foregoing and other objectives, features, and advantages of the present disclosure will be more obvious through more detailed descriptions of the embodiments of the present disclosure with reference to the accompanying drawings. The accompanying drawings are used for further understanding of the embodiments of the present disclosure, are a part of the present disclosure, are used for explaining the present disclosure together with the embodiments of the present disclosure, and does not constitute a limitation on the present disclosure. In the accompanying drawings, the same reference signs usually represent the same components or steps.

DETAILED DESCRIPTION OF EMBODIMENTS

Figure 1:
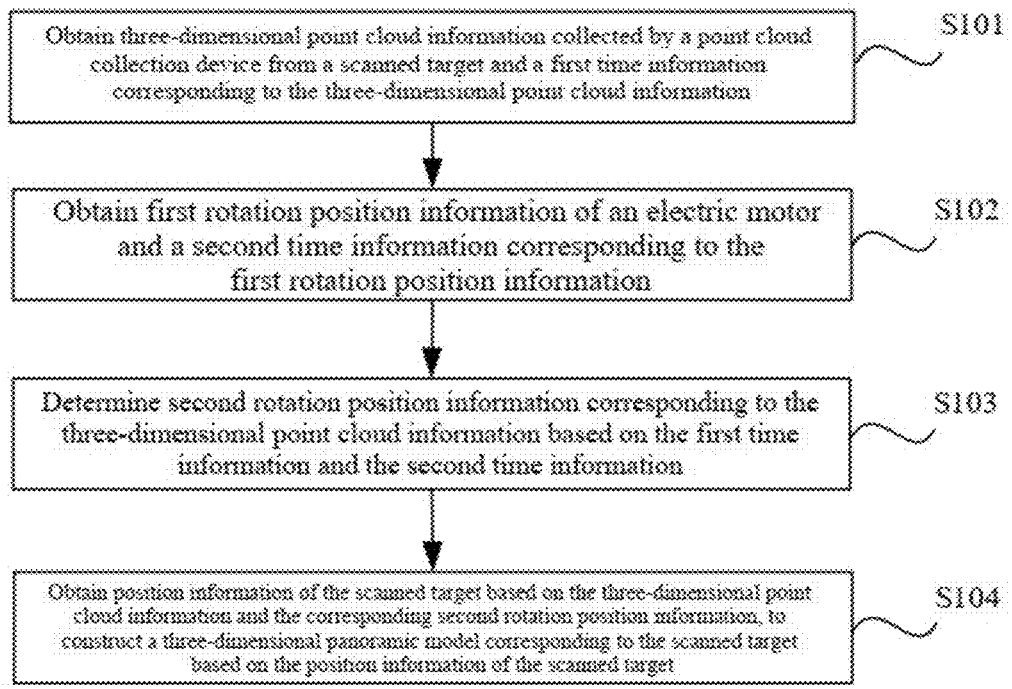
FIG. 1 is a flowchart of a modeling method based on point cloud data according to some embodiments of the present disclosure.

The following describes in detail example embodiments of the present disclosure with reference to the accompanying drawings. Obviously, the described embodiments are some rather than all of embodiments of the present disclosure. It should be understood that the present disclosure is not limited to the example embodiments described herein.

Unless otherwise specifically stated, relative arrangements of the components and steps, numerical expressions, and values described in these embodiments constitute no limitation on the scope of the present disclosure.

Those skilled in the art may understand that the terms "first" and "second" in the embodiments of the present disclosure are only used to distinguish between different steps, devices, or modules, etc., and represent neither any specific technical meaning nor a definite logic sequence therebetween.

It should be understood that in the embodiments of the present disclosure, "a plurality of" may refer to two or more than two, and "at least one" may refer to one, two, or more than two.

It should be understood that any component, data, or structure mentioned in the embodiments of the present disclosure may be generally; understood as one or more if it is not explicitly defined or given the opposite enlightenment in the context.

In addition, the term "and/or" in the present disclosure simply represents an association relationship that describes associated objects, and represents that three relationships may exist. For example, A and/or B may represent the following three cases: only A exists, both A and B exist, and only B exists. In addition, the character "/" in the present disclosure generally indicates an "or" relationship between the associated objects.

It should be further understood that the description of the embodiments in the present disclosure emphasizes the differences between the embodiments, and for the same or similar parts, reference can be made to each other. For brevity, details are not repeatedly described herein.

In addition, it should be understood that, for ease of description, the dimensions of the various parts shown in the accompanying drawings are not drawn according to the actual proportional relationship.

The following description of at least one exemplary embodiment is actually merely illustrative and does not serve as any limitation on the present disclosure and its application or use.

Technologies, methods, and devices known to those of ordinary skill in the related art may not be discussed in detail, but should be considered as part of the present disclosure where appropriate.

In some examples, similar reference signs and letters refer to similar items in the following accompanying drawings. Therefore, once a specific item is defined in one of the accompanying drawings, it need not be further discussed in subsequent accompanying drawings.

The embodiments of the present disclosure can be applied to electronic devices such as terminal devices, computer systems, and servers, which can operate with numerous other general-purpose or dedicated computing system environments or configurations. Examples of well-known terminal devices, computing systems, environments, and/or configurations suitable for use with electronic devices such as terminal devices, computer systems, or servers include but are not limited to: a personal computer system, a server computer system, a thin client, a thick client, a handheld or laptop device, a microprocessor-based system, a set top box, a programmable consumer electronics, a networked personal computer, a small computer system, a large computer system, and a distributed cloud computing technology environment including any of the above systems, etc.

The electronic devices such as terminal devices, computer systems, and servers may be described in the general context of computer system executable instructions (such as a program module) executed by the computer system. Generally, a program module may include a routine, a program, a target program, a component, logic, a data structure, etc., which perform specific tasks or implement specific abstract data types. The computer systems/servers may be implemented in a distributed cloud computing environment. In the distributed cloud computing environment, a task may be performed by a remote processing device linked through a communication network. In the distributed cloud computing environment, the program module may be located on a local or remote computing system storage medium including a storage device.

In a process of implementing the present disclosure, it is found by the inventor that a laser radar needs to perform a scan in a motion state in a process of three-dimensional modeling, while at present, a position for splicing data returned by the laser radar is usually determined by using an IMU, historical scanning data, algorithmic estimation, and other information. However, this leads to high costs, while it is difficult to guarantee precision, which causes a lower quality of modeling.

A modeling method based on point cloud data provided in the present disclosure includes: obtaining three-dimensional point cloud information collected by a point cloud collection device from a scanned target and a first time information; obtaining first rotation position information of an electric motor and a second time information; determining second rotation position information corresponding to the three-dimensional point cloud information based on the first time information and the second time information; and obtaining position information of the scanned target based on the three-dimensional point cloud information and the second rotation position information, to construct a three-dimensional panoramic model corresponding to the scanned target. In this way, a position of point cloud data in a three-dimensional panoramic model can be more precisely determined. In addition, according to some embodiments of the present disclosure, an error generated during running of the electric motor can be further eliminated, a time for collecting point cloud data can be shortened, efficiency of modeling can be improved, and the accuracy and quality of three-dimensional panoramic modeling can be enhanced, thereby providing better user experience.

FIG. 1 is a flowchart of a modeling method based on point cloud data according to some embodiments of the present disclosure. As shown in FIG. 1, the method may include steps S101 to S104. The steps are described individually below.

S101: Three-dimensional point cloud information collected by a point cloud collection device from a scanned target and a first time information corresponding to the three-dimensional point cloud information are obtained.

In some embodiments, the scanned target may be a living room, a bedroom, a dining room, a kitchen, a bathroom, etc. The three-dimensional point cloud information may be information, for example, a three-dimensional point cloud image of the living room, the bedroom, the dining room, the kitchen, the bathroom, etc. There may be a plurality of types of point cloud collection devices, such as laser radars and depth cameras. The three-dimensional point cloud information collected by the point cloud collection device at a plurality of data collection points and the first time information when the three-dimensional point cloud information is collected by the point cloud collection device may be obtained. The first time information may be a collection time or the like.

S102: First rotation position information of an electric motor and a second time information corresponding to the first rotation position information are obtained.

In some embodiments, the electric motor is configured to drive the point cloud collection device to rotate. For example, the electric motor may drive the point cloud collection device to rotate horizontally or in another manner. The first rotation position information may be a rotation angle or the like of an output shaft of the electric motor. The second time information corresponding to the rotation angle of the electric motor may be a time when the output shaft of the electric motor is at a specific angle.

S103: Second rotation position information corresponding to the three-dimensional point cloud information is determined based on the first time information and the second time information.

In some embodiments, the electric motor drives the point cloud collection device to rotate, and when the point cloud collection device rotates to a data collection point, the point cloud collection device collects the three-dimensional point cloud information. A rotation angle corresponding to the three-dimensional point cloud information may be determined by obtaining the first time information when the three-dimensional point cloud information is collected by the point cloud collection device and the second time information corresponding to the rotation angle of the electric motor and determining the second time information matching the first time information.

S104: Position information of the scanned target is obtained based on the three-dimensional point cloud information and the second rotation position information, to construct a three-dimensional panoramic model corresponding to the scanned target based on the position information of the scanned target.

In some embodiments, the point cloud collection device may rotate 360 degrees about a fixed point to collect the three-dimensional point cloud information. The position information of the scanned target may be obtained based on the three-dimensional point cloud information and the second rotation position information corresponding to the three-dimensional point cloud information. The position information of the scanned target may be three-dimensional coordinates or the like of the scanned target. A three-dimensional panorama is a virtual reality technology of real scenes based on panoramic images. The three-dimensional panoramic model is precisely obtained through splicing by putting the three-dimensional point cloud data in corresponding positions of the scanned target, which can eliminate an error generated during running of the electric motor.

Figure 2A:
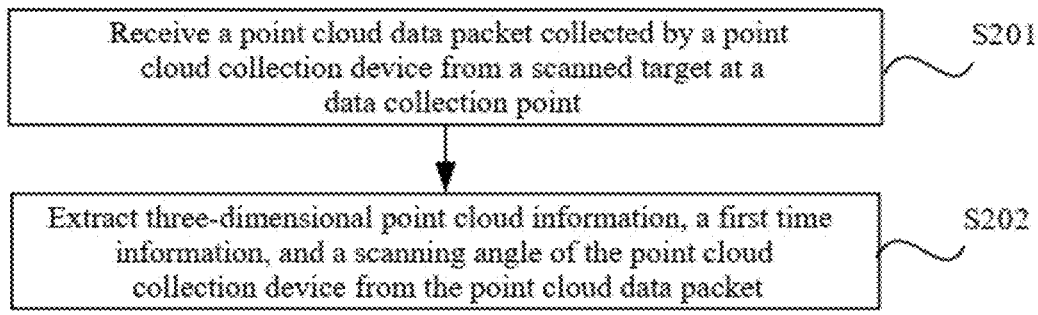
FIG. 2A is a flowchart of obtaining data collected by a point cloud collection device according to some embodiments of the present disclosure.

There may be a plurality of manners of obtaining the three-dimensional point cloud information collected by the point cloud collection device from the scanned target and the first time information corresponding to the three-dimensional point cloud information. FIG. 2A is a flowchart of obtaining data collected by a point cloud collection device according to some embodiments of the present disclosure. A method shown in FIG. 2 includes the following steps: S201 and S202. The steps are described individually below.

S201: A point cloud data packet collected by the point cloud collection device from the scanned target at a data collection point is received.

S202: The three-dimensional point cloud information, the first time information, and a scanning angle of the point cloud collection device are extracted from the point cloud data packet.

In some embodiments, the electric motor may drive the point cloud collection device to rotate to the data collection point, and the point cloud collection device scans the target to be scanned at the data collection point to obtain the three-dimensional point cloud information and the first time information. The point cloud collection device generates the point cloud data packet based on the three-dimensional point cloud information, the first time information, the scanning angle of the point cloud collection device, etc., and then uploads the point cloud data packet.

By parsing the point cloud data packet, the three-dimensional point cloud information, the first time information, and the scanning angle of the point cloud collection device are obtained. The scanning angle is an included angle between a scanning direction of the point cloud collection device and a plane of rotation of the point cloud collection device. For example, if the plane of rotation of the point cloud collection device is a horizontal plane, the scanning angle is a pitch angle of the point cloud collection device.

During rotating and shooting of the point cloud collection device at a single data collection point, a rotation speed of the electric motor is changing, so that there are an acceleration, a deceleration, and uniform motion. Each data packet collected by the point cloud collection device includes tens of sets of point cloud data. An interval between moments when the point cloud collection device are at two adjacent data collection points is about tens of microseconds (us). 1,000 to 3,000 data collection points may be covered by a full revolution of the point cloud collection device. Based on matching of the first time information and the second time information, a position (three-dimensional spatial position) of each piece of the point cloud data in the three-dimensional panoramic model can be precisely determined.

There are a plurality of manners of obtaining the first rotation position information of the electric motor and the second time information corresponding to the first rotation position information. For example, a pulse signal sent by an encoder and the second time information corresponding to the pulse signal may be received. The encoder is mounted on the output shaft of the electric motor. The encoder outputs n pulse signals as the output shaft makes a full revolution, where a value of n depends on a model of the encoder. The rotation angle of the electric motor can be obtained based on the number of pulse signals. For example, when n is 36,000, and the number of pulse signals is 100, the rotation angle of the electric motor is 1 degree. In other examples, a pulse signal sent by a controller and the second time information corresponding to the pulse signal may alternatively be received. The controller is configured to drive the electric motor to run. The electric motor may be, for example, a stepper motor. The controller can send uniform pulse signals. After the pulse signals enter a drive of the electric motor, the drive converts the pulse signals into strong current signals required for the electric motor, to drive the electric motor to run, which can precisely control a rotation angle of the electric motor. Either of the encoder and the controller can obtain information about rotation of the electric motor.

Figure 2B:
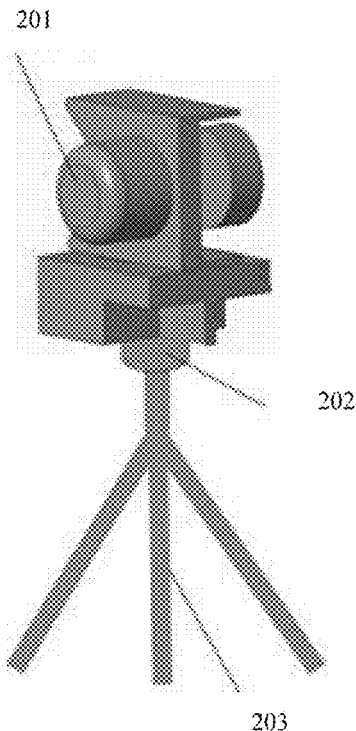
FIG. 2B is a schematic diagram of driving a laser radar by using an electric motor according to some embodiments of the present disclosure.

In some embodiments, the point cloud collection device may be a laser radar. FIG. 2B is a schematic diagram of driving a laser radar by using an electric motor according to some embodiments of the present disclosure. In an example shown in FIG. 2B, the point cloud collection device is a laser radar 201, where the laser radar 201 is side-mounted, and an electric motor 202 rotates to drive the laser radar 201 to rotate for shooting. The electric motor 202 is placed on a tripod 203. A high-precision encoder with high subdivision is provided on an output shaft of the electric motor 202 and can return a pulse signal and a second time information corresponding to the pulse signal. The second time information can have a degree of precision of microsecond (us) or even nanosecond (ns). A rotation angle of the electric motor 202 that can be accurate to 0.01 degree may be obtained based on the number of pulse signals.

Figure 3:
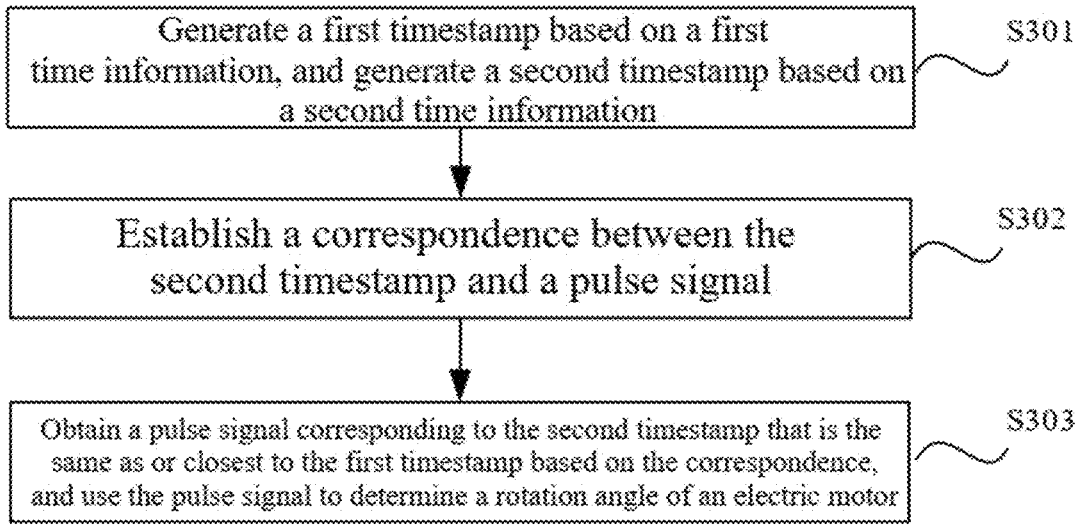
FIG. 3 is a flowchart of determining rotation position information according to some embodiments of the present disclosure.

There may be a plurality of manners of determining the second rotation position information corresponding to the three-dimensional point cloud information based on the first time information and the second time information. FIG. 3 is a flowchart of determining second rotation position information corresponding to three-dimensional point cloud information according to some embodiments of the present disclosure. A method shown in FIG. 3 includes the following steps: S301 to S303. The steps are described individually below.

S301: A first timestamp is generated based on the first time information, and a second timestamp is generated based on the second time information.

In some embodiments, the first time information is a time, having a degree of precision of millisecond or the like, when the three-dimensional point cloud information is collected by the point cloud collection device. The first timestamp may be generated based on the first time information. The second time information is a time, having a degree of precision of millisecond or the like, corresponding to the pulse signal. The second timestamp may be generated based on the second time information.

S302: A correspondence is established between the second timestamp and the pulse signal.

S303: A pulse signal corresponding to the second timestamp that is the same as or closest to the first timestamp is obtained based on the correspondence, and the pulse signal is used to determine the rotation angle of the electric motor.

In some embodiments, because the point cloud collection device may collect the three-dimensional point cloud data when the electric motor 202 is at a standstill, the first timestamp and the second timestamp corresponding to the same data collection point may be different from each other. The pulse signal corresponding to the second timestamp that is the same as or closest to the first timestamp may be obtained, and the rotation angle of the electric motor 202 is determined based on the pulse signal. In some examples, the position information of the scanned target may further include an X-axis coordinate value, a Y-axis coordinate value, and a Z-axis coordinate value of the scanned target, and the position information of the scanned target may be three-dimensional spatial coordinates.

Figure 4:
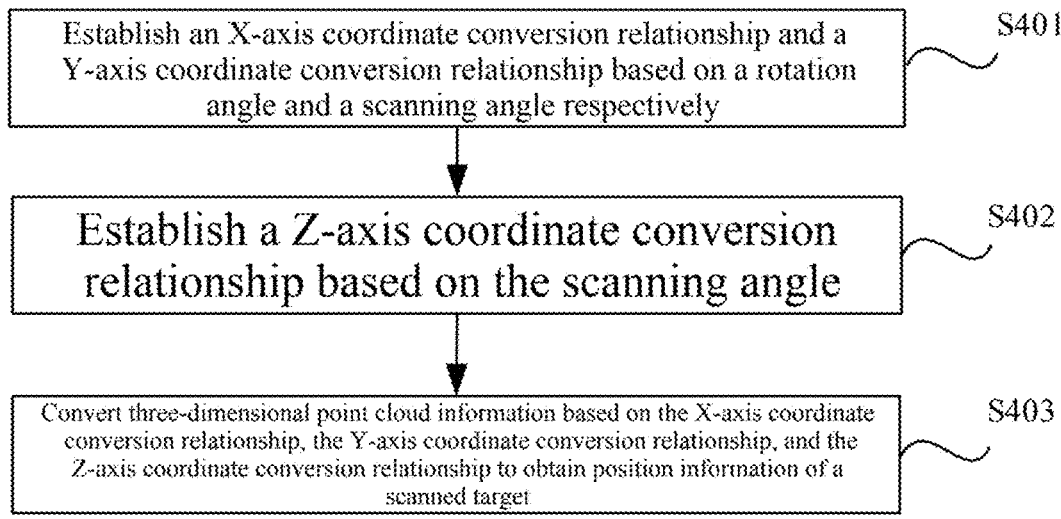
FIG. 4 is a flowchart of obtaining position information of a scanned target according to some embodiments of the present disclosure.

There may be a plurality of manners of obtaining position information of the scanned target based on the three-dimensional point cloud information and the second rotation position information. FIG. 4 is a flowchart of obtaining position information of a scanned target according to some embodiments of the present disclosure. A method shown in FIG. 4 includes the following steps: S401 to S403. The steps are described individually below.

S401: An X-axis coordinate conversion relationship and a Y-axis coordinate conversion relationship are established based on the rotation angle and the scanning angle respectively.

S402: A Z-axis coordinate conversion relationship is established based on the scanning angle.

S403: The three-dimensional point cloud information is converted based on the X-axis coordinate conversion relationship, the Y-axis coordinate conversion relationship, and the Z-axis coordinate conversion relationship to obtain the position information of the scanned target.

In some embodiments, the position information of the scanned target may be three-dimensional coordinate information in a three-dimensional space, and the three-dimensional point cloud information may include the distance between the point cloud collection device and the scanned target. In some examples, the X-axis coordinate conversion relationship may be: $x_n = d_n * \cos \beta_n * \cos \alpha_n$. The Y-axis coordinate conversion relationship may be: $y_n = d_n * \sin \beta_n * \cos \alpha_n$. The Z-axis coordinate conversion relationship may be: $z_n = * \sin \alpha_n$. Here, $d_n$ is the distance between the point cloud collection device and the scanned target, $x_n$ is the X-axis coordinate value, $y_n$ is the Y-axis coordinate value, $z_n$ is the Z-axis coordinate value, $\beta_n$ is a rotation angle of the point cloud collection device corresponding to the rotation angle, the point cloud collection device rotates in a horizontal plane, $\alpha_n$ is the scanning angle, and the scanning angle may be a pitch angle. $\beta_n$ may have a value range of 0° to 360°, and $\alpha_n$ may have a value range [−180°, +180°].

The rotation angle of the electric motor 202 may be the same as a rotation angle of the laser radar 201. The electric motor 202 may alternatively drive the laser radar to rotate by using a transmission mechanism. A coefficient for converting the rotation angle of the electric motor 202 into the rotation angle of the laser radar 201 may be set, such that the rotation angle of the laser radar 201 is obtained based on a product of the rotation angle of the electric motor 202 and the conversion coefficient.

Figure 5:
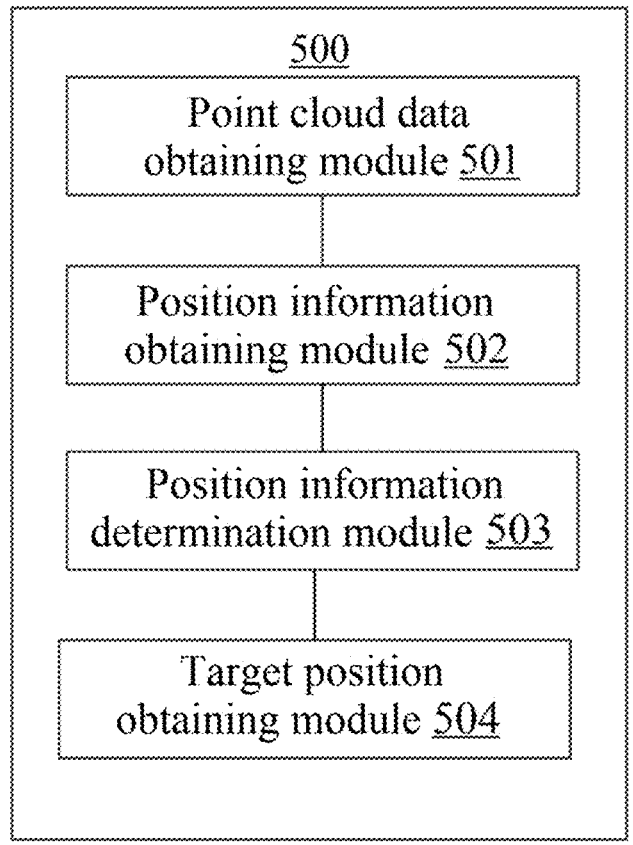
FIG. 5 is a schematic structural diagram of a modeling apparatus based on point cloud data according to some embodiments of the present disclosure.

The present disclosure further provides a modeling apparatus based on point cloud data. FIG. 5 is a schematic structural diagram of a modeling apparatus 500 based on point cloud data according to some embodiments of the present disclosure. As shown in FIG. 5, the apparatus 500 includes: a point cloud data obtaining module 501, a position information obtaining module 502, a position information determination module 503, and a target position obtaining module 504. The point cloud data obtaining module 501 is configured to obtain three-dimensional point cloud information collected by a point cloud collection device from a scanned target and a first time information corresponding to the three-dimensional point cloud information. The position information obtaining module 502 is configured to obtain first rotation position information of an electric motor 202 and a second time information corresponding to the first rotation position information. The electric motor 202 is configured to drive the point cloud collection device to rotate.

The position information determination module 503 is configured to determine second rotation position information corresponding to the three-dimensional point cloud information based on the first time information and the second time information. The target position obtaining module 504 is configured to obtain position information of the scanned target based on the three-dimensional point cloud information and the second rotation position information, to construct a three-dimensional panoramic model corresponding to the scanned target based on the position information of the scanned target.

In some embodiments, the point cloud data obtaining module 501 is further configured to receive a point cloud data packet collected by the point cloud collection device from the scanned target at a data collection point. The electric motor 202 drives the point cloud collection device to rotate to the data collection point. The point cloud data obtaining module 501 is further configured to extract the three-dimensional point cloud information, the first time information, and a scanning angle of the point cloud collection device from the point cloud data packet. The scanning angle is an included angle between a scanning direction of the point cloud collection device and a plane of rotation of the point cloud collection device. The position information obtaining module 502 is further configured to receive a pulse signal sent by a controller or an encoder and the second time information corresponding to the pulse signal. The controller is configured to drive the electric motor 202 to run, and the encoder is mounted on an output shaft of the electric motor 202 to measure a rotation speed of the electric motor 202.

In some embodiments, the position information determination module 503 is further configured to: generate a first timestamp based on the first time information, and generate a second timestamp based on the second time information. The position information determination module 503 is further configured to establish a correspondence between the second timestamp and the pulse signal. The position information determination module 503 is further configured to: obtain, based on the correspondence, a pulse signal corresponding to the second timestamp that is the same as or closest to the first timestamp, and use the pulse signal to determine the rotation angle of the electric motor 202.

In some embodiments, the position information of the scanned target may include an X-axis coordinate value, a Y-axis coordinate value, and a Z-axis coordinate value of the scanned target. Tyre target position obtaining module 504 is further configured to establish an X-axis coordinate conversion relationship and a Y-axis coordinate conversion relationship based on the rotation angle and the scanning angle respectively. The target position obtaining module 504 is further configured to establish a Z-axis coordinate conversion relationship based on the scanning angle. The target position obtaining module 504 is further configured to convert the three-dimensional point cloud information based on the X-axis coordinate conversion relationship, the Y-axis coordinate conversion relationship, and the Z-axis coordinate conversion relationship to obtain the position information of the scanned target.

In some embodiments, the three-dimensional point cloud information may further include a distance between the point cloud collection device and the scanned target. The X-axis coordinate conversion relationship is: $x_n = d_n * \cos \beta_n * \cos \alpha_n$; the Y-axis coordinate conversion relationship is: $y_n = d_n * \sin \beta_n * \cos \alpha_n$; and the Z-axis coordinate conversion relationship is: $z_n = d_n * \sin \alpha_n$, where $d_n$ is the distance, $x_n$ is the X-axis coordinate value, $y_n$ is the Y-axis coordinate value, $z_n$ is the Z-axis coordinate value, $\beta_n$ is a rotation angle of the point cloud collection device corresponding to the rotation angle, the point cloud collection device rotates in a horizontal plane, $\alpha_n$ is the scanning angle, and the scanning angle is a pitch angle.

Figure 6:
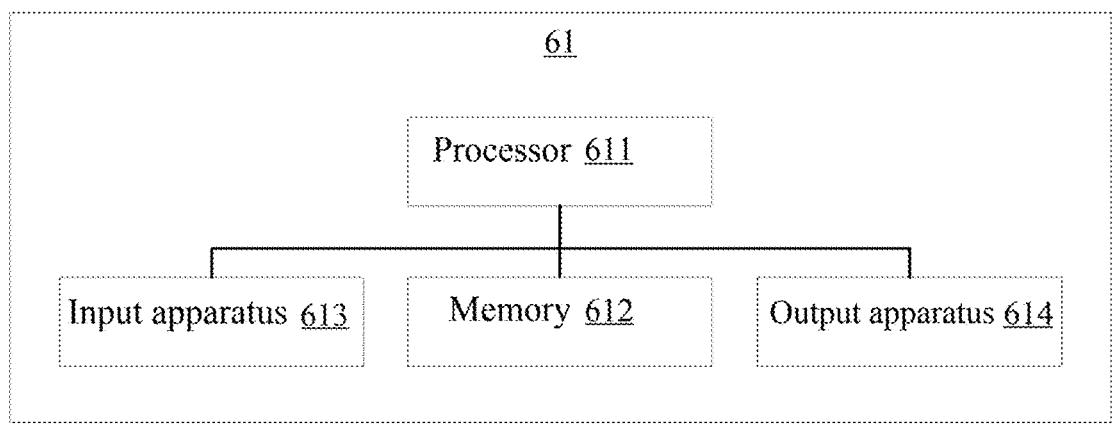
FIG. 6 is a schematic diagram of an electronic device according to some embodiments of the present disclosure.

FIG. 6 is a schematic diagram of an electronic device according to some embodiments of the present disclosure.

As shown in FIG. 6, an electronic device 61 includes one or more processors 611 and memories 612.

The processor 611 may be a central processing unit (CPU) or other forms of processing units having data processing capabilities and/or instruction execution capabilities, and may control other components in the electronic device 61 to perform desired functions.

The memories 612 may include one or more computer program products, and the computer program products may include various forms of computer-readable storage media, such as a volatile memory and/or a non-volatile memory. The volatile memory may include, for example: a random access memory (RAM) and/or a cache, etc. The non-volatile memory may include, for example: a read-only memory (ROM), a hard disk, a flash memory, etc. One or more computer program instructions may be stored on the computer-readable storage medium, and the processor 611 can execute the program instruction to implement the modeling method based on point cloud data and/or other desired functions in various embodiments described above of the present disclosure. Various contents such as input signals, signal components, and noise components can also be stored in the computer-readable storage medium.

In some examples, the electronic device 61 may further include: an input apparatus 613, an output apparatus 614, etc. The components are interconnected by means of a bus system and/or other forms of connecting mechanisms (not shown). In addition, the input apparatus 613 may further include a keyboard, a mouse, etc. The output apparatus 614 may output various types of information to the outside. The output apparatus 614 may include, for example, a display, a speaker, a printer, a communication network, and a remote output device connected thereto, etc.

Only some of the components of the electronic device 61 that are related to the present disclosure are shown in FIG. 6, and components such as buses and input/output interfaces are omitted. In addition, depending on a specific application scenario, the electronic device 61 may further include any other suitable component.

In some embodiments, the embodiments of the present disclosure further provide a computer program product, storing a computer program/instruction thereon. When the computer program instruction is executed by a processor, the processor performs the modeling method based on point cloud data according to the various embodiments of the present disclosure.

The computer program product can write program codes for performing operations of the embodiments of the present disclosure in any combination of one or more programming languages. The programming languages include an object-oriented programming language, for example, Java and C++, and further include conventional procedural programming languages, such as "C" language or similar programming languages. The program code may be completely executed on a computing device of a user, partially executed on a user device, executed as a separate software package, partially executed on a computing device of a user and partially executed on a remote computing device, or completely executed on a remote computing device or server.

In some embodiments, the embodiments of the present disclosure further provide a computer-readable storage medium, storing a computer program/instruction thereon. When the computer program/instruction is executed by a processor, the processor performs the modeling method based on point cloud data according to the various embodiments of the present disclosure. In some examples, the computer-readable storage medium may be a non-transitory computer-readable storage medium.

The computer-readable storage medium may be any combination of one or more readable media. The readable medium may be a readable signal medium or a readable storage medium. An example of the readable storage medium may include but is not limited to electric, magnetic, optical, electromagnetic, infrared, or semiconductor systems, apparatuses or devices, or any combination of the above. More specific examples of the readable storage media (a non-exhaustive list) may include: an electrical connection having one or more wires, a portable disk, a hard disk, a random access memory (RAM), a read only memory (ROM), an erasable programmable read only memory (EPROM or flash memory), fiber optics, a portable compact disk read only memory (CD-ROM), an optical storage device, a magnetic storage device, or any suitable combination thereof.

The basic principles of the present disclosure are described above in conjunction with the embodiments. It should be noted that the advantages, superiorities, effects, etc., mentioned in the present disclosure are only examples but not limitations, and these advantages, superiorities, effects, etc. cannot be considered as necessities for various embodiments of the present disclosure. In addition, the specific details disclosed above are only examples but not limitations, and the details described above do not limit the present disclosure to use the specific details described above for implementation.

By using the modeling method and apparatus based on point cloud data, the electronic device, the storage medium, and the computer program product according to the embodiments of the present disclosure, three-dimensional point cloud information collected by a point cloud collection device from a scanned target, a first time information, first rotation position information of an electric motor 202, and a second time information are obtained; second rotation position information is determined based on the first time information and the second time information, and position information of the scanned target is obtained based on the three-dimensional point cloud information and the second rotation position information, to construct a three-dimensional panoramic model corresponding to the scanned target. In this way, a position of point cloud data in a three-dimensional panoramic model can be precisely determined. In addition, according to some embodiments, an error generated during running of the electric motor can be further eliminated, accuracy of splicing point cloud data can be improved, a time for collecting the point cloud data can be shortened, efficiency of modeling can be improved, and the accuracy and quality of three-dimensional panoramic modeling can be enhanced, thereby effectively providing better user experience.

The embodiments in the present disclosure are described in a progressive manner. Each embodiment describes the differences from other embodiments, and for the same or similar parts among the various embodiments, reference can be made to each other. The apparatus embodiment basically corresponds to the method embodiment, and for related details, reference can be made to part of the description of the method embodiment.

The block diagrams of devices, apparatuses, equipment, and systems involved in the present disclosure are merely illustrative examples and are not intended to require or imply that a connection, arrangement, and configuration must be implemented in the manner shown in the block diagrams. Those skilled in the art will recognize that these devices, apparatuses, equipment, and systems may be connected, arranged, and configured in any manner. In the present disclosure, the terms such as "include", "contain", and "have" are open words, which refer to "including but not limited to" with which the terms can be used interchangeably. The terms "or" and "and" may refer to "and/or" with which the terms can be used interchangeably unless the context clearly indicates otherwise. The term "such as" may refer to "for example, but not limited to".

There may be various ways to implement the method and apparatus in the present disclosure. For example, the method and apparatus of the present disclosure may be implemented by means of software, hardware, firmware, or any combination of software, hardware, and firmware. The above sequence of steps for the method is merely for illustration, and the steps of the method of the present disclosure are not limited to the sequence specifically described above unless otherwise specifically stated. In addition, in some embodiments, the present disclosure may also be implemented as programs recorded in a recording medium, the programs including machine-readable instructions for implementing the method according to the present disclosure. Therefore, the present disclosure also covers the recording medium storing the programs for implementing the method according to the present disclosure.

It should also be noted that, in the apparatus, device and method of the present disclosure, various components or various steps can be decomposed and/or recombined. These decompositions and/or recombinations should be regarded as equivalent solutions of the present disclosure.

The above descriptions of the present disclosure may be provided to enable those skilled in the art to make or use the present disclosure. General principles defined in the present disclosure may be applied to other aspects without departing from the scope of the present disclosure. Therefore, the present disclosure is not intended to be limited to the aspects shown herein, but in accordance with the widest scope consistent with the principles and features disclosed herein.

The above description has been given for the purpose of illustration and description. Moreover, this description is not intended to limit the embodiments of the present disclosure to the form disclosed herein. Although various example aspects and embodiments have been discussed above, those skilled in the art will conceive certain variations, modifications, changes, additions, and sub-combinations thereof.

What is claimed is:

1. A modeling method based on point cloud data, comprising:
obtaining three-dimensional point cloud information collected by a point cloud collection device from a scanned target and a first time information when the three-dimensional point cloud information is collected;
obtaining first rotation position information of an electric motor and a second time information corresponding to the first rotation position information, wherein the electric motor is configured to drive the point cloud collection device to rotate;
determining second rotation position information corresponding to the three-dimensional point cloud information based on the first time information and the second time information; and
obtaining position information of the scanned target based on the three-dimensional point cloud information and the second rotation position information, to construct a three-dimensional panoramic model corresponding to the scanned target based on the position information of the scanned target.

2. The method according to claim 1, wherein the obtaining three-dimensional point cloud information collected by a point cloud collection device from a scanned target and a first time information when the three-dimensional point cloud information is collected comprises:
receiving a point cloud data packet collected by the point cloud collection device from the scanned target at a data collection point, wherein the electric motor drives the point cloud collection device to rotate to the data collection point; and
extracting the three-dimensional point cloud information, the first time information, and a scanning angle of the point cloud collection device from the point cloud data packet,
wherein the scanning angle is an included angle between a scanning direction of the point cloud collection device and a plane of rotation of the point cloud collection device.

3. The method according to claim 1, wherein the obtaining first rotation position information of an electric motor and a second time information corresponding to the first rotation position information comprises:
receiving a pulse signal sent by a controller or an encoder and the second time information corresponding to the pulse signal,
wherein the controller is configured to drive the electric motor to run, and the encoder is mounted on an output shaft of the electric motor to measure a rotation speed of the electric motor.

4. The method according to claim 3, wherein the determining second rotation position information corresponding to the three-dimensional point cloud information based on the first time information and the second time information comprises:
generating a first timestamp based on the first time information, and generating a second timestamp based on the second time information;
establishing a correspondence between the second timestamp and the pulse signal; and
obtaining, based on the correspondence, a pulse signal corresponding to the second timestamp that is the same as or closest to the first timestamp, and using the pulse signal to determine a rotation angle of the electric motor.

5. The method according to claim 4, wherein the position information of the scanned target comprises: an X-axis coordinate value, a Y-axis coordinate value, and a Z-axis coordinate value of the scanned target; and the obtaining position information of the scanned target based on the three-dimensional point cloud information and the second rotation position information comprises:
establishing an X-axis coordinate conversion relationship and a Y-axis coordinate conversion relationship based on the rotation angle and the scanning angle respectively;
establishing a Z-axis coordinate conversion relationship based on the scanning angle; and
converting the three-dimensional point cloud information based on the X-axis coordinate conversion relationship, the Y-axis coordinate conversion relationship, and the Z-axis coordinate conversion relationship to obtain the position information of the scanned target.

6. The method according to claim 5, wherein the three-dimensional point cloud information comprises: a distance between the point cloud collection device and the scanned target;

the established X-axis coordinate conversion relationship is: $x_n = d_n * \cos \beta_n * \cos \alpha_n$;
the established Y-axis coordinate conversion relationship is: $y_n = d_n * \sin \beta_n * \cos \alpha_n$; and
the established Z-axis coordinate conversion relationship is: $z_n = d_n * \sin \alpha_n$,
where $d_n$ is the distance, $x_n$ is the X-axis coordinate value, $y_n$ is the Y-axis coordinate value, $z_n$ is the Z-axis coordinate value, $\beta_n$ is the rotation angle of the electric motor, the point cloud collection device rotates in a horizontal plane, $\alpha_n$ is the scanning angle, and the scanning angle is a pitch angle.

7. A non-transitory computer-readable storage medium having a computer program stored thereon, wherein when the computer program is executed by a processor, implements a modeling method based on point cloud data, the method comprising:
obtaining three-dimensional point cloud information collected by a point cloud collection device from a scanned target and a first time information when the three-dimensional point cloud information is collected;
obtaining first rotation position information of an electric motor and a second time information corresponding to the first rotation position information, wherein the electric motor is configured to drive the point cloud collection device to rotate;
determining second rotation position information corresponding to the three-dimensional point cloud information based on the first time information and the second time information; and
obtaining position information of the scanned target based on the three-dimensional point cloud information and the second rotation position information, to construct a three-dimensional panoramic model corresponding to the scanned target based on the position information of the scanned target.

8. The medium according to claim 7, wherein the obtaining three-dimensional point cloud information collected by a point cloud collection device from a scanned target and a first time information when the three-dimensional point cloud information is collected comprises:
receiving a point cloud data packet collected by the point cloud collection device from the scanned target at a data collection point, wherein the electric motor drives the point cloud collection device to rotate to the data collection point; and
extracting the three-dimensional point cloud information, the first time information, and a scanning angle of the point cloud collection device from the point cloud data packet,
wherein the scanning angle is an included angle between a scanning direction of the point cloud collection device and a plane of rotation of the point cloud collection device.

9. The medium according to claim 7, wherein the obtaining first rotation position information of an electric motor and a second time information corresponding to the first rotation position information comprises:
receiving a pulse signal sent by a controller or an encoder and the second time information corresponding to the pulse signal,
wherein the controller is configured to drive the electric motor to run, and the encoder is mounted on an output shaft of the electric motor to measure a rotation speed of the electric motor.

10. The medium according to claim 9, wherein the determining second rotation position information corresponding to the three-dimensional point cloud information based on the first time information and the second time information comprises:
- generating a first timestamp based on the first time information, and generating a second timestamp based on the second time information;
- establishing a correspondence between the second timestamp and the pulse signal; and
- obtaining, based on the correspondence, a pulse signal corresponding to the second timestamp that is the same as or closest to the first timestamp, and using the pulse signal to determine a rotation angle of the electric motor.

11. The medium according to claim 10, wherein the position information of the scanned target comprises: an X-axis coordinate value, a Y-axis coordinate value, and a Z-axis coordinate value of the scanned target; and the obtaining position information of the scanned target based on the three-dimensional point cloud information and the second rotation position information comprises:
- establishing an X-axis coordinate conversion relationship and a Y-axis coordinate conversion relationship based on the rotation angle and the scanning angle respectively;
- establishing a Z-axis coordinate conversion relationship based on the scanning angle; and
- converting the three-dimensional point cloud information based on the X-axis coordinate conversion relationship, the Y-axis coordinate conversion relationship, and the Z-axis coordinate conversion relationship to obtain the position information of the scanned target.

12. The medium according to claim 11, wherein the three-dimensional point cloud information comprises: a distance between the point cloud collection device and the scanned target;
- the established X-axis coordinate conversion relationship is: $x_n = d_n * \cos \beta_n * \cos \alpha_n$;
- the established Y-axis coordinate conversion relationship is: $y_n = d_n * \sin \beta_n * \cos \alpha_n$; and
- the established Z-axis coordinate conversion relationship is: $z_n = d_n * \sin \alpha_n$,
- where $d_n$ is the distance, $x_n$ is the X-axis coordinate value, $y_n$ is the Y-axis coordinate value, $z_n$ is the Z-axis coordinate value, $\beta_n$ is the rotation angle of the electric motor, the point cloud collection device rotates in a horizontal plane, $\alpha_n$ is the scanning angle, and the scanning angle is a pitch angle.

13. An electronic device, comprising:
- a processor; and
- a memory and a computer program stored on the memory,
- wherein the processor is configured to execute the computer program to implement a modeling method based on point cloud data, the method comprising:
  - obtaining three-dimensional point cloud information collected by a point cloud collection device from a scanned target and a first time information when the three-dimensional point cloud information is collected;
  - obtaining first rotation position information of an electric motor and a second time information corresponding to the first rotation position information, wherein the electric motor is configured to drive the point cloud collection device to rotate;
  - determining second rotation position information corresponding to the three-dimensional point cloud information based on the first time information and the second time information; and
  - obtaining position information of the scanned target based on the three-dimensional point cloud information and the second rotation position information, to construct a three-dimensional panoramic model corresponding to the scanned target based on the position information of the scanned target.

14. The device according to claim 13, wherein the obtaining three-dimensional point cloud information collected by a point cloud collection device from a scanned target and a first time information when the three-dimensional point cloud information is collected comprises:
- receiving a point cloud data packet collected by the point cloud collection device from the scanned target at a data collection point, wherein the electric motor drives the point cloud collection device to rotate to the data collection point; and
- extracting the three-dimensional point cloud information, the first time information, and a scanning angle of the point cloud collection device from the point cloud data packet,
- wherein the scanning angle is an included angle between a scanning direction of the point cloud collection device and a plane of rotation of the point cloud collection device.

15. The device according to claim 13, wherein the obtaining first rotation position information of an electric motor and a second time information corresponding to the first rotation position information comprises:
- receiving a pulse signal sent by a controller or an encoder and the second time information corresponding to the pulse signal,
- wherein the controller is configured to drive the electric motor to run, and the encoder is mounted on an output shaft of the electric motor to measure a rotation speed of the electric motor.

16. The device according to claim 15, wherein the determining second rotation position information corresponding to the three-dimensional point cloud information based on the first time information and the second time information comprises:
- generating a first timestamp based on the first time information, and generating a second timestamp based on the second time information;
- establishing a correspondence between the second timestamp and the pulse signal; and
- obtaining, based on the correspondence, a pulse signal corresponding to the second timestamp that is the same as or closest to the first timestamp, and using the pulse signal to determine a rotation angle of the electric motor.

17. The device according to claim 16, wherein the position information of the scanned target comprises: an X-axis coordinate value, a Y-axis coordinate value, and a Z-axis coordinate value of the scanned target; and the obtaining position information of the scanned target based on the three-dimensional point cloud information and the second rotation position information comprises:
- establishing an X-axis coordinate conversion relationship and a Y-axis coordinate conversion relationship based on the rotation angle and the scanning angle respectively;
- establishing a Z-axis coordinate conversion relationship based on the scanning angle; and
- converting the three-dimensional point cloud information based on the X-axis coordinate conversion relationship, the Y-axis coordinate conversion relationship, and the Z-axis coordinate conversion relationship to obtain the position information of the scanned target.

18. The device according to claim 17, wherein the three-dimensional point cloud information comprises: a distance between the point cloud collection device and the scanned target;

the established X-axis coordinate conversion relationship is: $x_n = d_n * \cos \beta_n * \cos \alpha_n$;

the established Y-axis coordinate conversion relationship is: $y_n = d_n * \sin \beta_n * \cos \alpha_n$; and the established Z-axis coordinate conversion relationship is: $z_n = d_n * \sin \alpha_n$, where $d_n$ is the distance, $x_n$ is the X-axis coordinate value, $y_n$ is the Y-axis coordinate value, $z_n$ is the Z-axis coordinate value, $\beta_n$ is the rotation angle of the electric motor, the point cloud collection device rotates in a horizontal plane, $\alpha_n$ is the scanning angle, and the scanning angle is a pitch angle.

\* \* \* \* \*